(12) United States Patent
Pettersson et al.

(10) Patent No.: US 6,940,278 B2
(45) Date of Patent: Sep. 6, 2005

(54) ANGLE TRANSDUCER

(75) Inventors: Bo Pettersson, Torshalla (SE); Carl-Erik Gustafsson, Eskilstuna (SE)

(73) Assignee: C E Johansson AB, Eskilstuna (SE)

(*) Notice: Subject to any disclaimer, the term of this patent is extended or adjusted under 35 U.S.C. 154(b) by 0 days.

(21) Appl. No.: 10/363,404

(22) PCT Filed: Aug. 20, 2001

(86) PCT No.: PCT/SE01/01773
§ 371 (c)(1),
(2), (4) Date: Aug. 11, 2003

(87) PCT Pub. No.: WO02/21081
PCT Pub. Date: Mar. 14, 2002

(65) Prior Publication Data
US 2004/0046548 A1 Mar. 11, 2004

(30) Foreign Application Priority Data
Sep. 4, 2000 (SE) ............................... 0003110

(51) Int. Cl.⁷ ................................................. G01B 7/30
(52) U.S. Cl. ............................................... 324/207.25
(58) Field of Search ................ 324/207.11, 207.12, 324/207.15–207.21, 207.23, 207.24, 207.25, 660–662; 73/660

(56) References Cited

U.S. PATENT DOCUMENTS 4,704,906 A * 11/1987 Churchill et al. ............... 73/660
4,839,646 A    6/1989 Tyson
5,598,153 A * 1/1997 Brasseur et al. ....... 340/870.37
2004/0027139 A1 * 2/2004 Pettersson et al. .......... 324/661

FOREIGN PATENT DOCUMENTS

EP    0 270 440     6/1988
GB    2 118 720 A   11/1983

* cited by examiner

Primary Examiner—Bot LeDynh
(74) Attorney, Agent, or Firm—Young & Thompson

(57) ABSTRACT

An angle transducer comprising a first disk, the rotor, with circularly arranged and radially directed receiver electrodes and a second disk, the stator, equipped with circularly arranged and radially directed transmitter electrodes arranged at the same radius as the receiver electrodes and with a fixed separation between the receiver and transmitter electrodes, whereby the disks are arranged coaxially and rotatable relative to each other, and the disks are further separated by a thin air-gap. The transmitter electrodes are each supplied with an alternating voltage with different phases for neighboring electrodes, whereby the number of supply phases, φ, is greater than two, and the separation of the transmitter electrodes=the separation of receiver electrodes/φ. The transmitter electrodes of the stator are geometrically arranged such that errors in their geometry relative to the geometry of the receiver electrodes produce equal but opposite error signal in the receiver electrodes of the rotor.

20 Claims, 15 Drawing Sheets

Prior Art
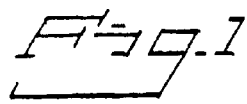
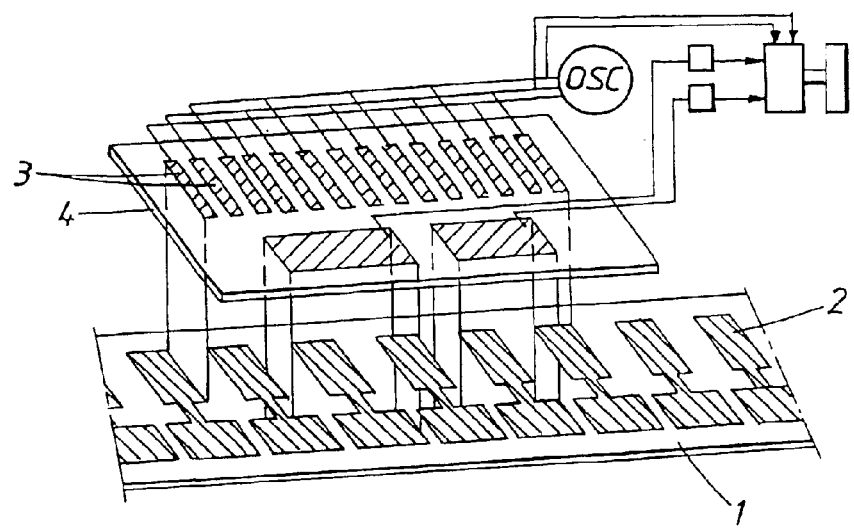
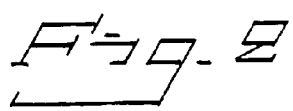 Prior Art
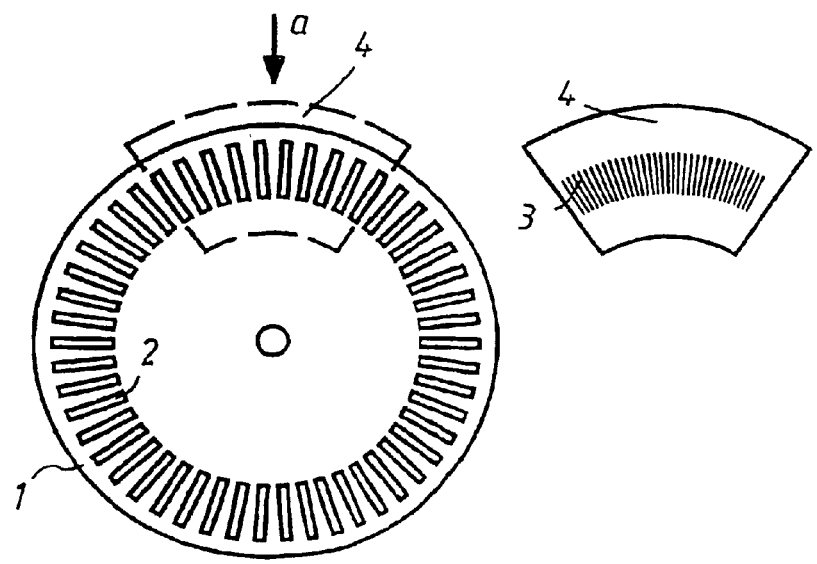

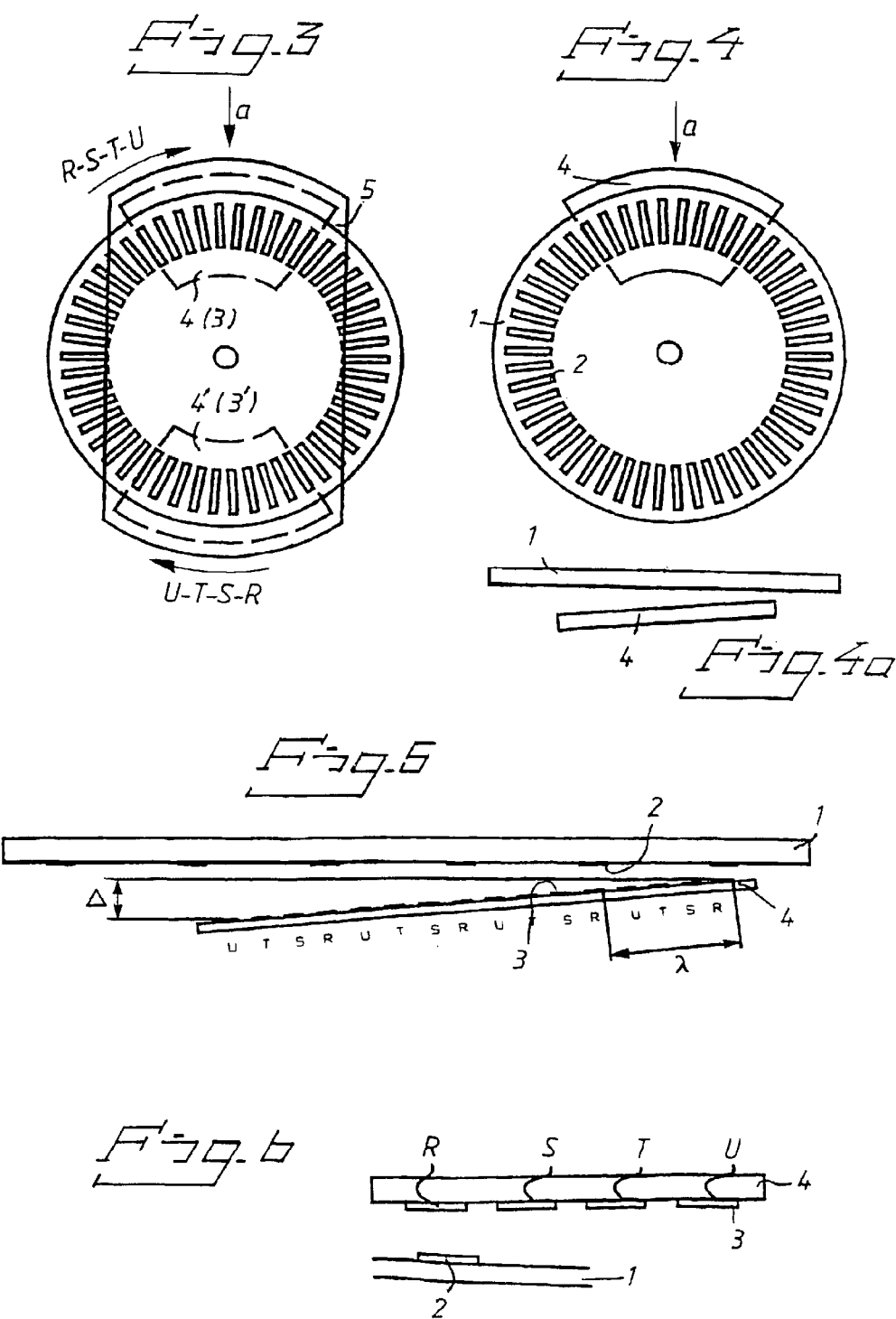

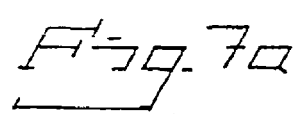 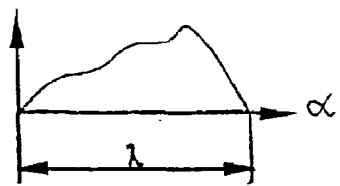
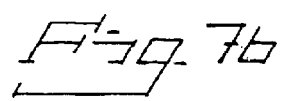 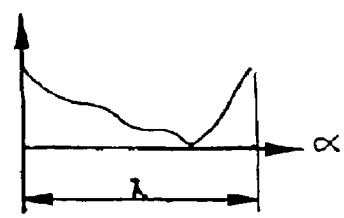
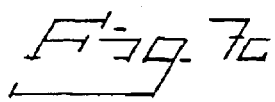 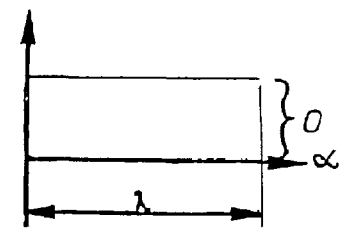
 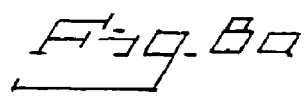
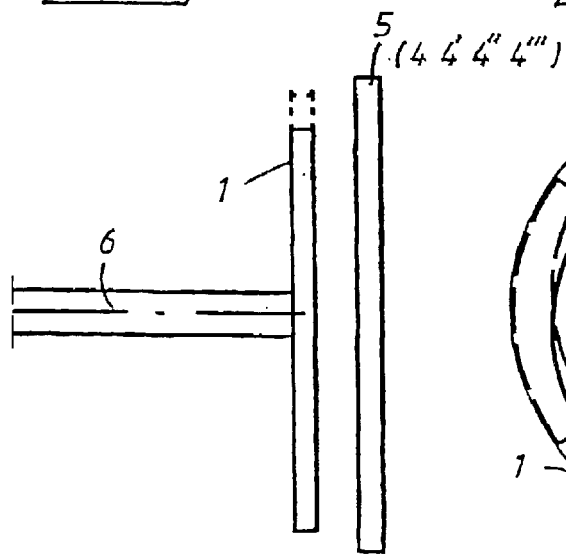 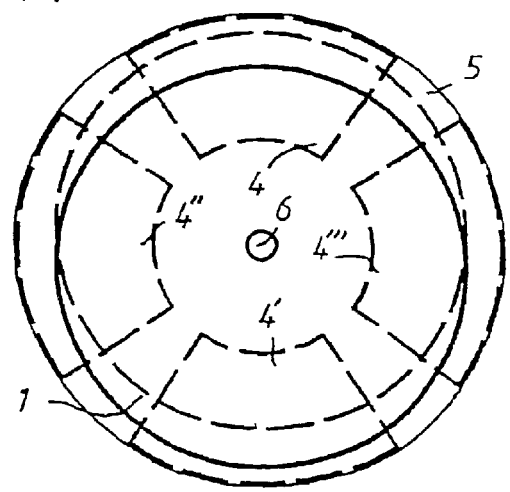

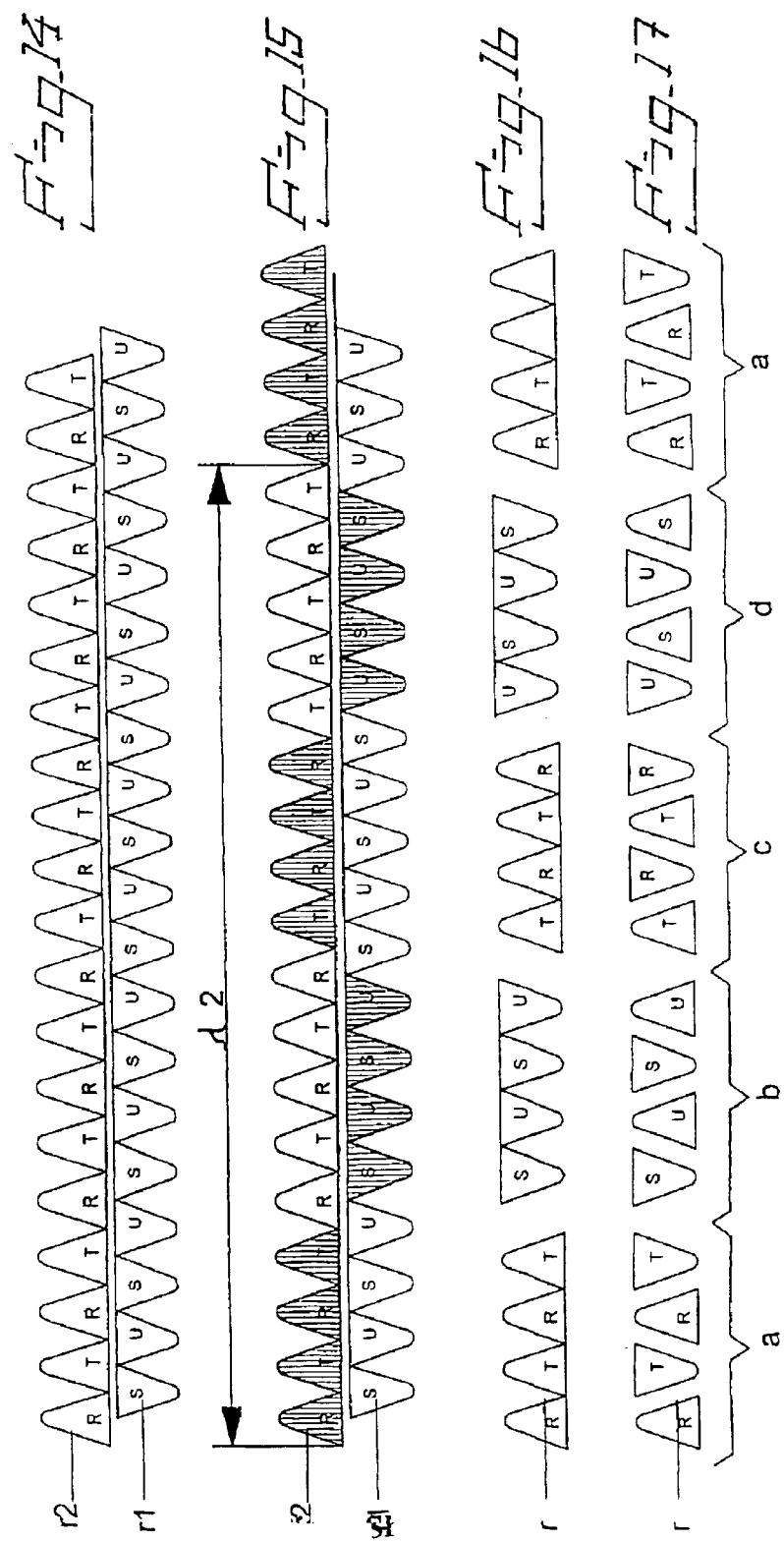

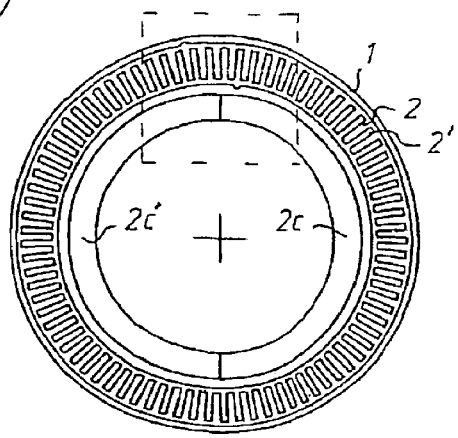
Fig.30
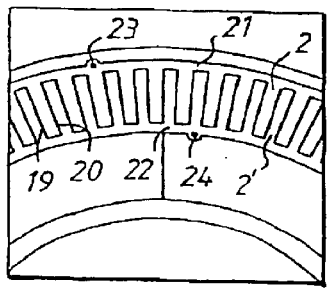
Fig.31
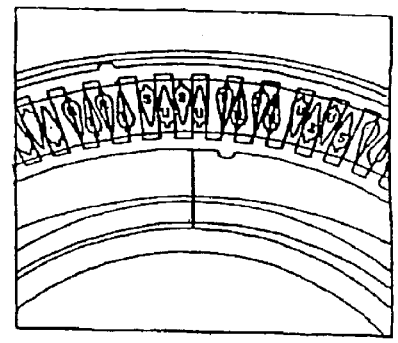
Fig.32
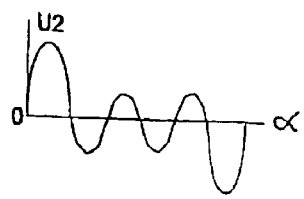
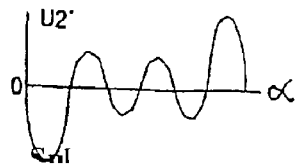
Fig.33

ANGLE TRANSDUCER

CROSS REFERENCE TO RELATED APPLICATION

This is the 35 USC 371 national stage of international application PCT/SE01/01773 filed on Aug. 20, 2001, which designated the United States of America.

FIELD OF THE INVENTION

The present invention concerns an angle transducer or angle encoder, which is used for the precise determination of the angle of rotation between two mutually rotatable parts.

BACKGROUND OF THE INVENTION

Angle transducers are machine components that are widely used for the purposes of guidance and control within industry. The annual consumption of transducers is very large. Such transducers are often used together with gearing in order to increase the resolution of the guided or controlled shaft. For example, with an angle transducer having a resolution of 10,000 increments/revolution and a gear with i=26 times, a resolution for the output shaft of approximately 5 seconds of arc can be achieved.

The disadvantage of this method is that it depends on the precision of the gearing and that it provides poor control of the final precision in the system since this is influenced by play, wear, etc. in the transmission.

Machine-builders strive to place the measurement/angle transducer at the extreme end of the transmission chain, that is, in direct association with the controlled/monitored machine part, in order to avoid such uncontrollable error influences. However, this requires high resolution angle transducers with a resolution of the order of a few seconds of arc or better. A number of products are available on the market with these properties.

The disadvantage of existing angle transducers, however, is that they are very expensive and place high demands on the precision and accuracy in their mounting.

Existing transducers are often of the optical incremental type, which causes them to loose all information if the angular position is changed, for example, following loss of power or switching off of the system. It is thus a major desire that an angle transducer should show absolute values, that is, correct information is to be always available independently of what has occurred during switching off and switching on. This is an advantage in systems for which safety aspects are of major significance. An absolute measurement function allows also design of measuring systems for long-term measurements with small power consumption, since the measuring system can be totally switched off between measurement operations.

DRAWINGS

Figure 9:
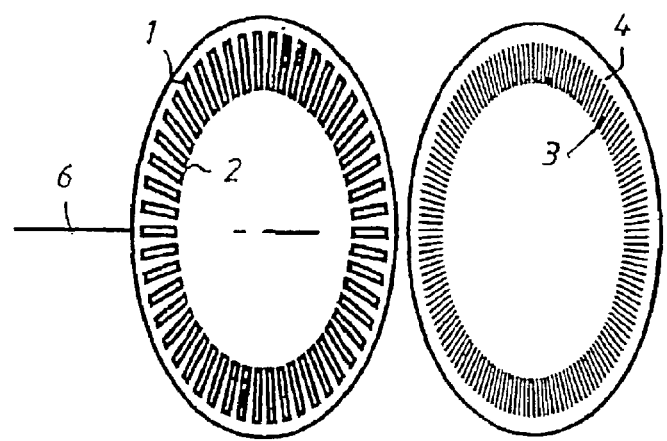
Figure 10:
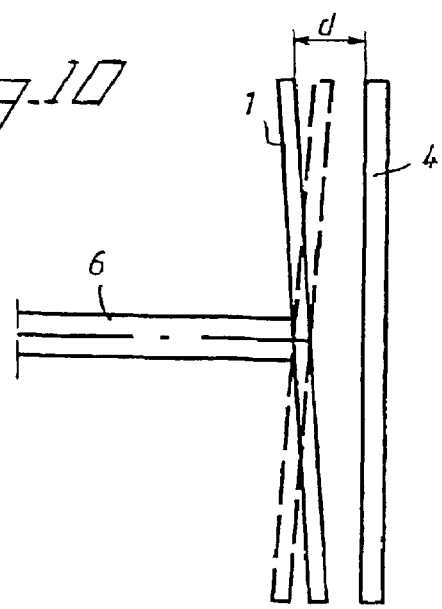
Figure 11:
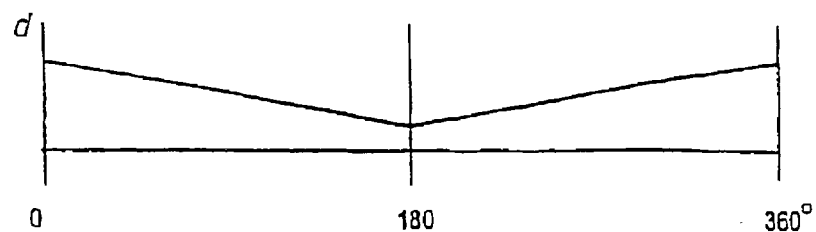
Figure 12:
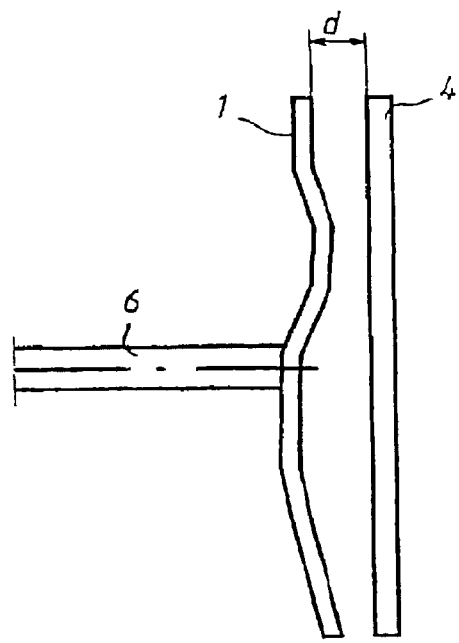
Figure 13:
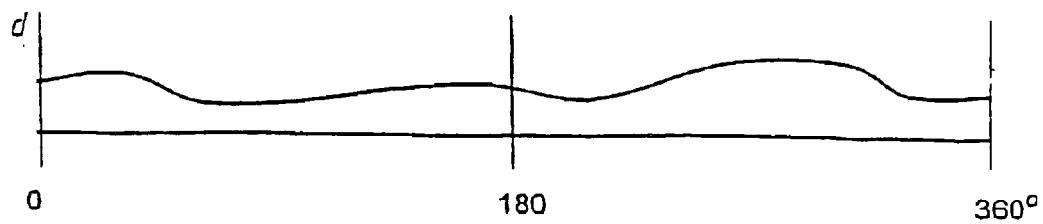
Figure 18:
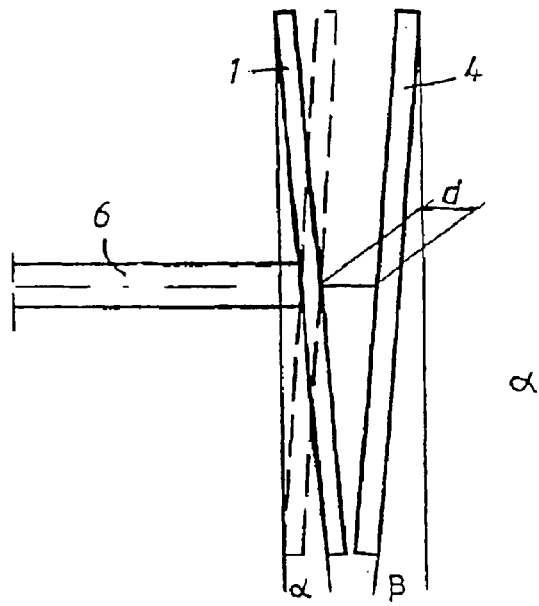
Figure 20:
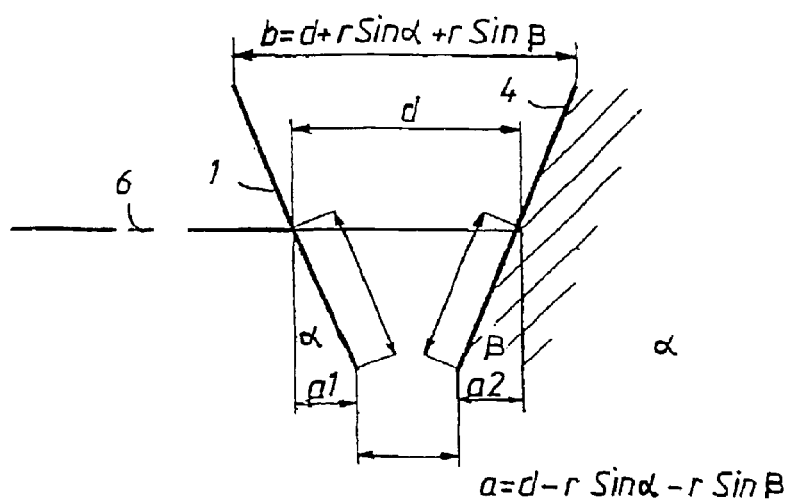
Figure 19:
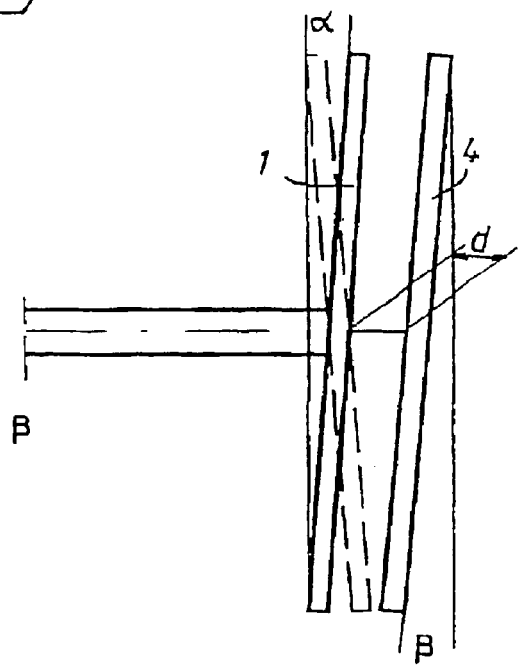
Figure 21:
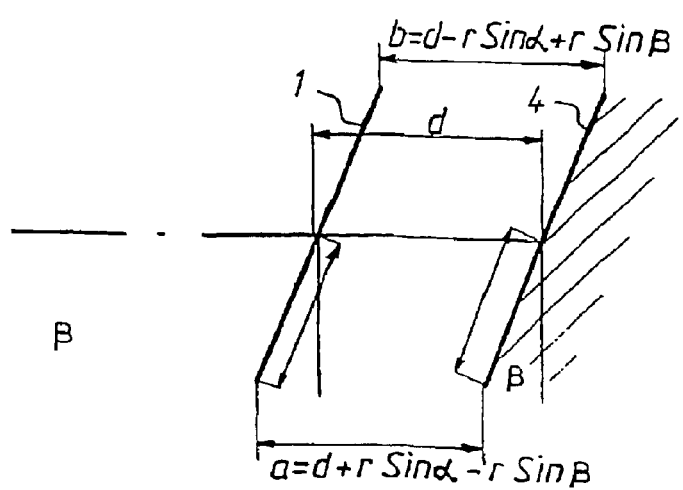
Figure 22:
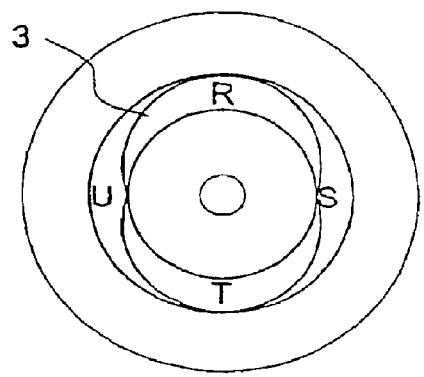
Figure 23:
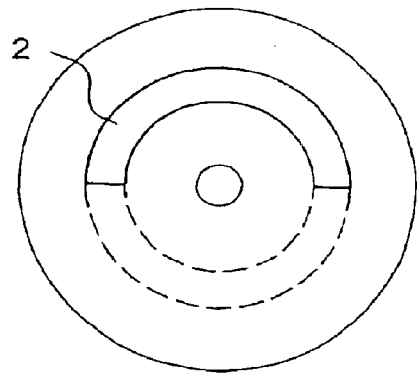
Figure 24:
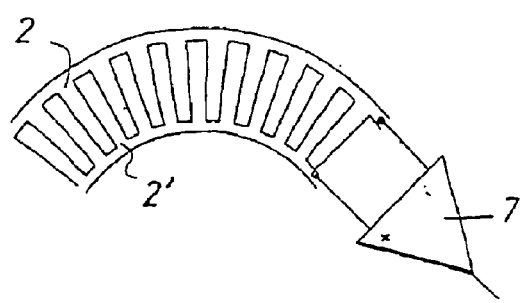
Figure 25:
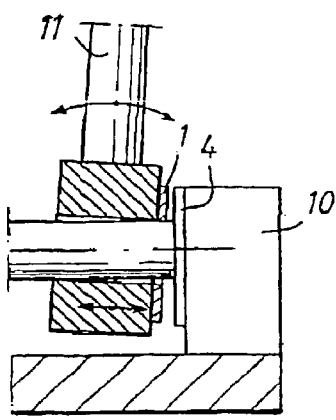
Figure 26:
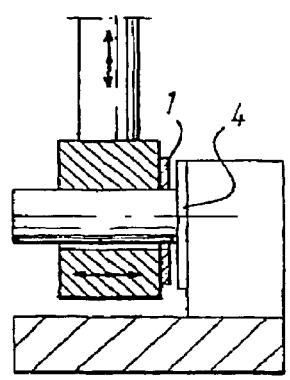
Figure 27:
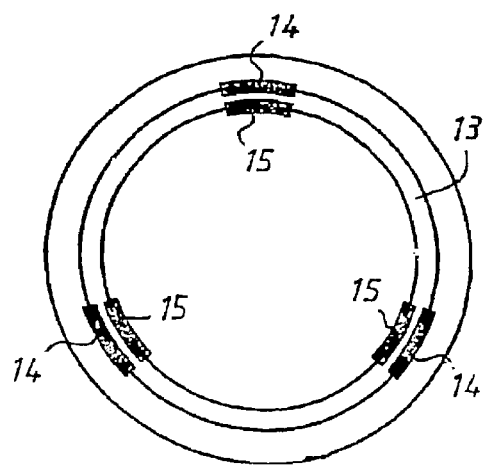
Figure 27A:
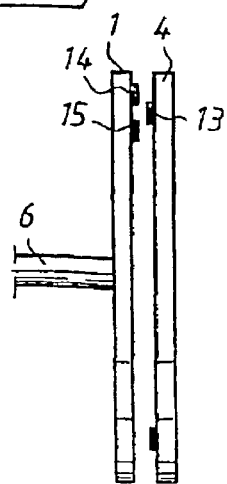
Figure 28:
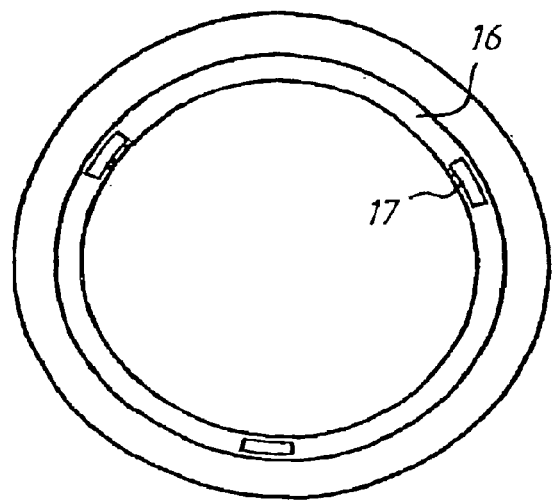
Figure 29:
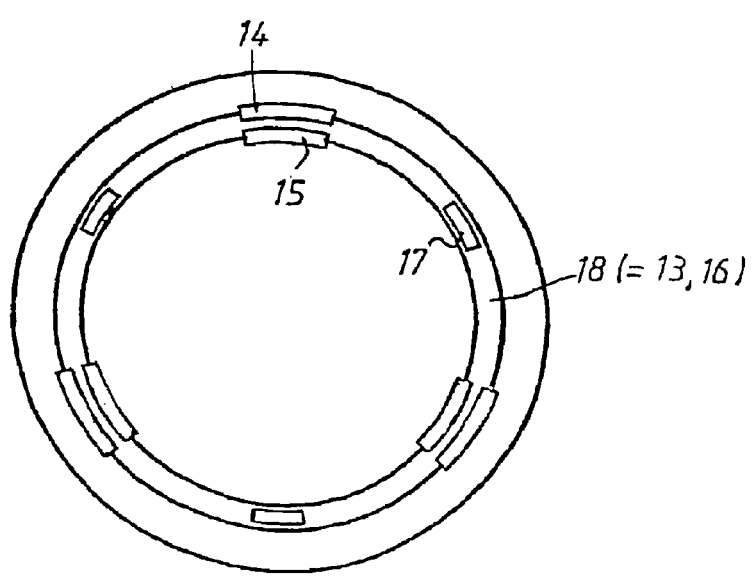
Figure 34:
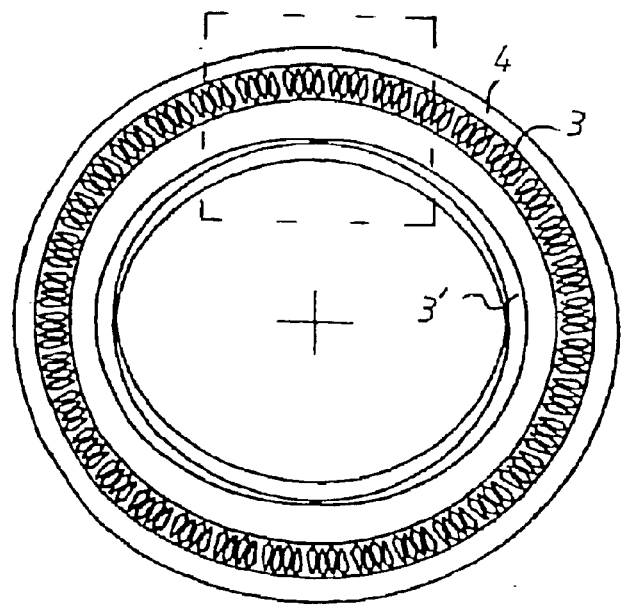
Figure 35:
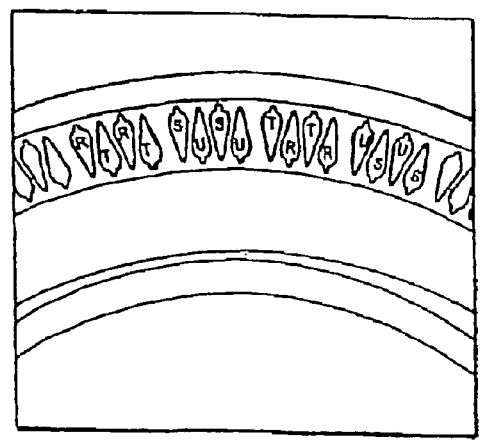
Figure 36:
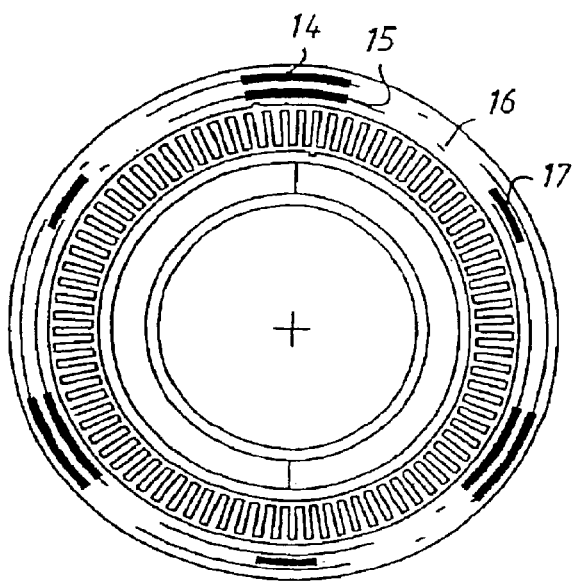
Figure 37:
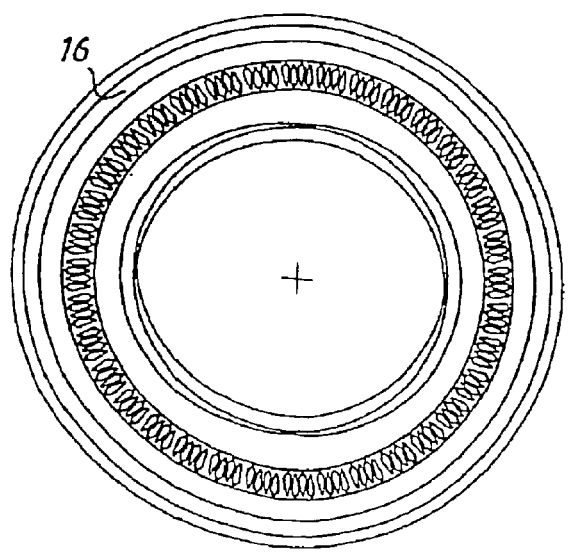
Figure 38:
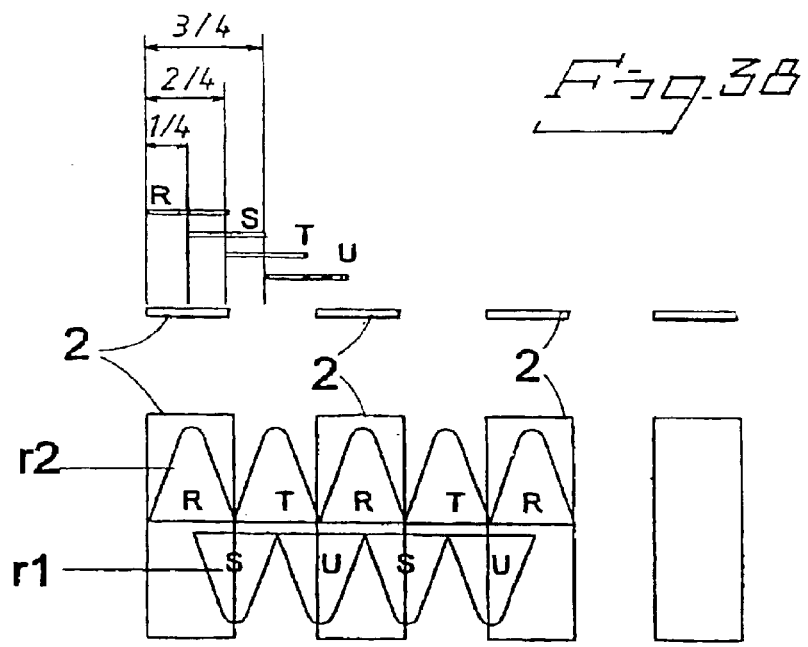
Figure 39:
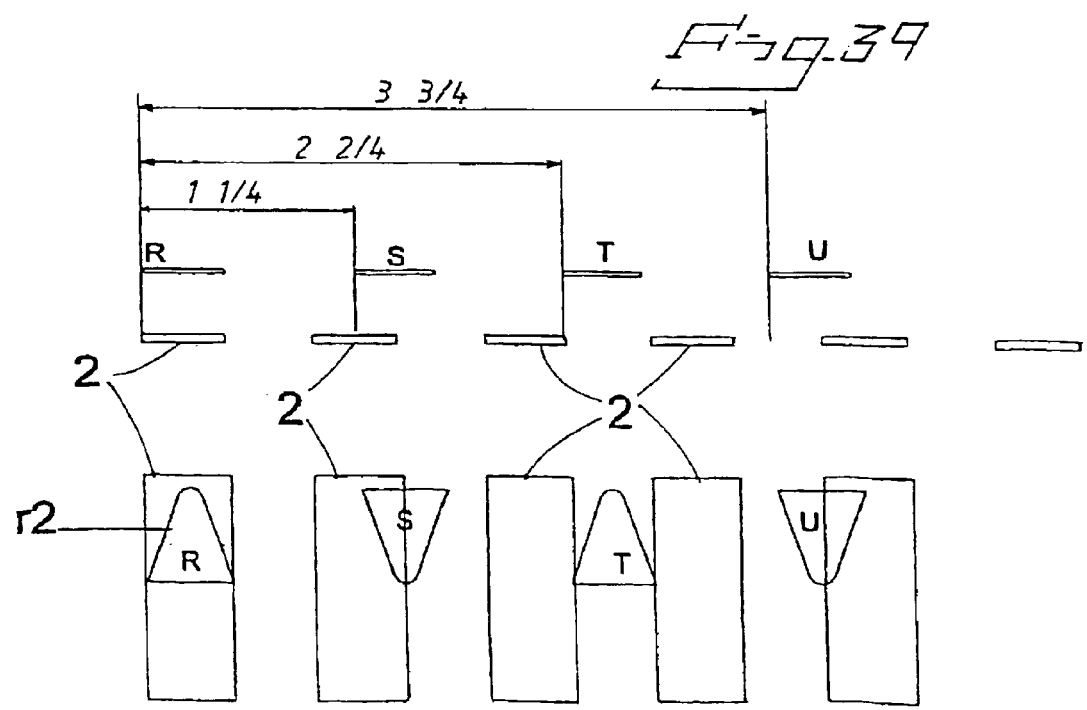

The invention will be described here against the background of the prior art and the problems associated with it, and with reference to the attached drawings, in which FIG. 1 shows the basic principle for capacitive measurement of lengths and angles according to the Swedish patent 7714010-1, FIG. 2 shows an angle transducer according to the Swedish patent 7714010-1, FIG. 3 shows an angle transducer according to the prior art with improved reliability against faulty radial mounting of the stator disk, FIG. 4 shows an angle transducer with faulty parallelism in the mounting of the stator, FIG. 4a shows a side view of the angle transducer from FIG. 4, FIG. 5 shows the error mechanism when the stator is mounted with faulty parallelism, FIG. 6 shows a more detailed view of the error mechanism in the event of faulty parallelism in the mounting of the stator, FIGS. 7a–c show an error curve over a distribution of angles between two rotor electrodes when the stator has been mounted with faulty parallelism, FIG. 8 shows an angle transducer in side view according to the prior art with improved resistance against faulty radial mounting and radial wobble of the rotor, FIG. 8a shows the angle transducer of FIG. 8 in a schematic plan view, FIG. 9 shows an angle transducer according to the prior art with improved resistance against faulty radial mounting and radial wobble of the rotor in one preferred embodiment, FIG. 10 shows an angle transducer with axial wobble in the bearings of the rotor disk, FIG. 11 shows schematically the variation in distance between the rotor disk and the stator during 360° in the presence of axial wobble according to FIG. 10, FIG. 12 shows faulty planeness of a rotor disk, FIG. 13 shows schematically the variation in distance between the rotor disk and the stator during 360° in the presence of faulty planeness according to FIG. 12, FIG. 14 shows stator electrodes when the stator electrode separation is half that of the rotor electrodes, FIG. 15 shows a principle for removal of electrodes during radial compression of the electrode system shown in FIG. 14, FIG. 16 shows the result of a first stage in the radial compression, FIG. 17 shows the electrode system of FIG. 16 after final geometrical permutation, FIG. 18 shows a general example in which both rotor and stator are subject to angular errors relative to the axis of rotation, shown exaggerated at an extreme position, FIG. 19 also shows a general example in which both rotor and stator are subject to angular errors relative to the axis of rotation, shown exaggerated at another extreme position, FIG. 20 shows an analysis of the position shown in FIG. 18, FIG. 21 shows an analysis of the position shown in FIG. 19, FIG. 22 shows one preferred embodiment of the supply electrodes on the stator disk of the scale of an absolute transducer, FIG. 23 shows one preferred embodiment of the receiver electrodes on the stator disk of the scale of an absolute transducer, FIG. 24 shows differentially arranged scales on the rotor disk to achieve an improved signal-to-noise ratio, FIG. 25 shows tilt of a device with a mounted angle transducer according to the invention, FIG. 26 shows radial displacement of the device according to FIG. 25, FIG. 27 shows additional electrodes to check the radial deviation (wobble) of a mechanical system from the centre of rotation, FIG. 27a shows the electrodes according to FIG. 27 in side view, FIG. 28 shows additional electrodes in order to check the angle deviations (axial movement, or wobble) of a mechanical system relative to the centre of rotation, FIG. 29 shows an improved arrangement of the electrodes in FIG. 27 and FIG. 28, FIG. 30 shows an example of a complete rotor disk according to the invention, but lacking the arrangements for measuring play, FIG. 31 shows an enlarged section of FIG. 30, FIG. 32 shows the interaction between the stator and rotor electrodes, FIG. 33 shows an example of the possible appearance of signals in the two differential receiver electrode fields 2 and 2', FIG. 34 shows an example of a complete stator disk according to the invention, but lacking the arrangements for measuring play, FIG. 35 shows an enlarged section of FIG. 34, FIG. 36 shows an example of a complete rotor disk according to the invention, with the arrangements for measuring play included, FIG. 37 shows an example of a complete stator disk according to the invention, with the arrangements for measuring play included, FIG. 38 shows the positions of the electrodes when the separation of the transmitter electrodes=the separation of the receiver electrodes/Φ, and FIG. 39 shows the positions of the electrodes for another arrangement.

THE PRIOR ART

The present invention concerns an angle transducer that is easy to manufacture and cheap, based on previously known capacitive technology, essentially as described in the Swedish patent 7714010-1. A first disk 1, FIG. 1, is equipped with a set of electrodes 2 that form a scale. A second disk 4 positioned above the first disk, separated from it by a narrow air-gap, is equipped with a second set of electrodes 3 that are each supplied with an alternating voltage. The disk that is supplied with alternating voltage will be most often denoted in the description below by "stator". One of the electrodes on the first disk 1 forms, at appropriate positions of the displacement, condensers together with one or two of the electrodes on the second disk 4, whereby the alternating voltage that has been applied to the electrode on the second disk is transferred to one of the electrodes 2 on the first disk 1. Which electrodes on the first and the second disk that form a condenser is determined by the relative displacement between the disks. In this way, the signal that is transferred to the first disk 1 also depends on the relative positions of the disks 1 and 4, and thus can be used to determine the size of the displacement between the disks.

One of the principal advantages of this technology is that the incorporated scaling elements can be manufactured using normal printed circuit technology and in this way are easy and cheap to manufacture.

The achievement of an angle transducer is also known through the Swedish patent 7714010-1. Thus, radially directed electrodes 2, 3 are placed, FIG. 2, into a circular pattern with respect to a centre that is common to both electrode patterns, in order to form scale disk 1 and supply pattern disk 4. In this way, one can choose either to allow the scale disk to remain stationary while the supply pattern disk can be turned, or vice versa. Alternatively, one can allow both the scale disk 1 and the supply pattern disk 4 to turn relative to a fixed position. It is simplest if the scale disk 1 constitutes the moveable element, that is, the rotatable element, while the supply pattern disk 4 is mounted to be stationary. It is assumed in the rest of this document that this is the preferred execution whereby the scale disk 1 will subsequently be termed the rotor and the supply pattern disk 4 the stator.

Disadvantages and Problems with the Prior Art

The technology that is described in the Swedish patent 7714010-1 is intended for the manufacture of length measurement scales with what are, from a relative point of view, fairly low resolution and precision. Significantly higher demands must be placed on the separation precision of the electrodes that form the measuring system in order to obtain the high precision that is required in a high resolution angle transducer. In the same way, stringent requirements are placed that the distance parallel to the axis between the disk 1, FIG. 2, that carries the rotor electrodes 2 and the disk 4 that carries the stator electrodes should be constant. If this distance is not the same for all pairs of electrodes, the electrodes will be given different "weights" with respect to the signal, which results in erroneous values. The cause of varying distance between the rotor disk and the stator disk can be, for example, axial wobble of the rotor disk 1, FIG. 10, or faults in the planeness of the rotor pate 1, FIG. 12. Another cause of such errors is poor parallelism between the rotor disk and the stator disk, that is, between the disks 1 and 4 in FIG. 1, or between the disks 1 and 4 in FIG. 4, shown in FIG. 4a. The mounting of the rotor disk 1 and the stator disk 4 must guarantee that the centres of rotation of the two disks are in the same place. In all cases described above, errors of the type shown in FIG. 5 and FIG. 6 arise, which result in periodic errors over one period of the scale separation, as is shown in FIG. 7.

In the same way, the rotor disk 1 must be mounted in bearings in such a manner that radial wobble is avoided, since a radial displacement of the rotor disk relative to the common centre of rotation of the disks results in a periodic variation over one revolution of the effective angle of separation between the electrodes of the rotor disk.

The Swedish patent 7714010-1 also describes a method for determining the absolute position along a linear scale, which in principle can also be used for an angular scale. The disadvantage of the method described is that a very high precision is required during manufacture of the two sub-scales that are used according to the patent in order to determine by "floating" the approximate position of the relative motion between disk 1 and 4, FIG. 1.

The Invention

The aim of the present invention, therefore, is to achieve an angle transducer that eliminates or minimises the demands on manufacture and mounting that have been described above, while still giving the possibility of a very precise measurement of angle.

The above-mentioned aim of the invention has been achieved with an angle transducer comprising a first disk, the rotor, with circularly arranged and radially directed receiver electrodes and a second disk, the stator, equipped with circularly arranged and radially directed transmitter electrodes arranged at the same radius as the receiver electrodes and with a constant separation between the receiver electrodes and the transmitter electrodes on the two disks, whereby the disks are arranged coaxially and rotatable relative to each other, and the disks are further separated by a thin air-gap that makes possible a capacitive or an inductive coupling between the electrode systems on the receiver disk and the transmitter disk, whereby the transmitter electrodes are each supplied with an alternating voltage with different phases for neighbouring electrodes, whereby the number of supply phases, Φ, is greater than two, and the separation of transmitter electrodes=the separation of receiver electrodes/Φ, where according to the invention, the transmitter electrodes of the stator are geometrically arranged such that errors in their geometry relative to the geometry of the receiver electrodes produces equal but opposite error signals in the receiver electrodes of the rotor. The angle transducer functions according to the capacitive principle that has been described in Swedish patent 7714010-1. A diagram of the principle of the arrangement of the system is shown in FIG. 1 for a linear scale.

FIG. 2 shows the arrangement of the system for measurement of angles of rotation in an angle transducer. Electrodes 2, FIG. 2, located at even intervals on a moving constituent part of the system known as the "rotor" 1 form in combination with electrodes 3 on a stationary disk 4 known as the "stator" variable condensers. Both electrode systems are directed radially towards a common centre of rotation.

The condenser plates that are present on the stator are supplied with alternating voltages that have the same frequency and amplitude, but have a phase shift relative to each other.

In one preferred embodiment, four alternating voltages R-S-T-U are used with phase shifts of 90° between them, whereby the electrode separation between the electrodes 3 on the stator plate 4 is one quarter of the angle separation between the rotor electrodes 2 on the plate 1. In general, n alternating voltages, where n>2, can be used for the supply voltages, whereby the separation of the stator=the separation of the rotor/n. When the angle of rotation between plate 1 and 4 is changed, the electrodes that are supplied with the alternating voltage R-S-T-U will, in sequence, enter such a position that they achieve capacitive coupling to one of the electrodes 2 on the rotor plate 1. The electrodes 2 that are present on the scale thus capture a signal from one of the electrodes 3 of the stator 4 through capacitive transmission. The phase of the signal that is captured by the scale is determined by the phase or phases of the one or two stator electrodes 3 with which the rotor electrode 2 has capacitive coupling, and in this way the phase of the signal that is captured by the scale depends on the angular position of the scale 1 relative to the stationary stator plate 4. The angular position within one scale period, that is, within the angle between two rotor electrodes 2, can in this way be uniquely determined.

Further capacitive arrangements intended for the purpose are required in order to determine the angular position within the complete revolution of 360°. Since the effective capacitance between the rotor electrode and the stator electrode will be very small for each individual pair of electrodes, a number of transmitter groups R;S;T;U that are connected in parallel from an electrical perspective are used on the stator in order to obtain an acceptable signal strength in the received scale signal, the electrodes 3 in FIG. 1.

According to the Swedish patent 7714010-1, the electrodes are located on the rotor and on the stator in the manner shown in FIG. 1. This gives the simplest electrical connection between the stator electrodes and the best "packing", that is, the most efficient area of electrodes in a given space. An angle transducer according to the same principle is shown in FIG. 2.

The disadvantage with the execution according to the Swedish patent 7714010-1 and FIG. 2 is that such an "obvious" location of the electrodes introduces sensitivity for the geometrical errors that arise in practice in the electrode systems on the rotor plate and on the stator plate. Some of this type of error that arise more or less unavoidably are:

1. Static radial displacement between rotor plate 1 and stator disk 4, FIG. 2, due to required assembly tolerances.
2. Dynamic radial displacement between rotor disk 1 and stator disk 4, FIG. 2, due to radial wobble of the rotor disk 1.
3. Static distance errors and parallelism errors in the air-gap between rotor 1 and stator 4, FIG. 2, caused by tilts due to required assembly tolerances.
4. Dynamic distance errors and parallelism errors in the air-gap between the rotor and the stator caused by radial wobble of the moving disk 1 during its rotation, FIG. 10.
5. Dynamic distance errors and parallelism errors in the air-gap between the rotor and the stator caused by faulty shape of the moving disk 1 during its rotation, FIG. 12.
6. Built-in separation errors in the electrode geometries of the rotor and stator arising from optical masters used in manufacture of the rotor and stator disks.

The present invention aims at reducing the requirement for manufacturing tolerances for the two electrode disks 1 and 4 that form the angle transducer and to reduce the requirements on mounting, by eliminating the effect of the geometrical errors in the electrode patterns and mounting geometry that have been described above. The method described in this patent application is based on eliminating errors that arise in the geometry of the rotor electrodes due to manufacture or mounting by means of differential geometrical balancing by arranging the electrode systems in such a manner that any error in the geometry of the rotor and/or stator gives, in addition to scaling signals with an error contribution of $+\delta$, scaling signals that contain a differential error contribution of $-\delta$. The desired result, $\delta=0$, is obtained by adding the two scaling signals.

The complete arrangement works as one collaborative system, but will be described in the following divided up stepwise with each type of error 1 to 5 being described individually.

Error Types 1 and 2

One method of avoiding the influence of radial wobble or of radial displacement of the stator disk in principle can be, for example, to equip the angle transducer in FIG. 2 with a second set of stator electrodes identical to the stator electrodes 3 that are already located on the disk 4 but displaced by 180° relative to the first disk 4. FIG. 3 shows such an arrangement. The figure shows the rotor disk 1 with the electrodes 2. Furthermore, the stator disk 4 is also present with the stator electrodes 3, as is a second stator disk 4' with electrodes 3' located diametrically opposite to disk 4. The two stator disks are in reality integrated on one common stator disk 5 shown in FIG. 3. In the event of a putative constant static displacement of the centre of rotation of the disk 1 relative to the centres of rotation of the disks 5, for example, in the direction of the arrow a, it will be realised that the signals excited in the rotor disk 1 by disk 4 will display an angular motion that is too small, since the distance between the stator electrodes and the actual centre of rotation has become smaller, which means that the effective angle between the stator electrodes has become larger. In an equivalent manner, the signals in the rotor disk 1 excited by the disk 4' will show too large an angular motion. The positive and the negative changes of the effective angle of inclusion between two neighbouring electrodes will, in general, not be equal in size, but the difference will be negligible if the radial motions are small. When the signals excited from the two disks 4 and 4' are added, the sum of the errors will thus cancel each other out.

In the event of a dynamic axial wobble, as is shown in FIGS. 8 and 8a, that is, in the event of the centre of bearing 6 of the rotor disk 1 not coinciding with the geometrical centre of the rotor electrode, one set of stator disks 4" and 4''' is required displaced by 90° relative to the pair of disks 4 and 4' in order to achieve a complete cancellation of the error. This is most clearly seen in FIG. 8a. It is generally true that at least three sets of disks 4 are required in order to obtain an error-cancellation effect.

One preferred embodiment, which is shown in FIG. 9, is to allow the stator electrodes 3 to enclose the complete revolution, i.e. 360° of the angle of rotation, whereby the number of phase groups R-S-T-U must be evenly divisible by two in order to obtain a full differential cancellation.

Error Types 3, 4 and 5

FIG. 4 shows the system both from the front and in a view seen in the direction of the arrow a. In the event of a static parallelism error between the rotor 1 and the stator 4, FIG. 4a, a wedge-shaped air-gap is formed between the rotor 1 and the stator 4. This is shown in more detail in FIG. 5, in which a stator containing four groups R-S-T-U of transmitter electrodes is shown and in which the tilt in the direction of motion of the system is Δ.

FIG. 6 shows in more detail how the coupling between one of the rotor electrodes 2 and the electrodes that are distributed longitudinally within an electrode group R-S-T-U is influenced by the tilt. As FIG. 6 makes clear, the capacitance between the stator electrode S and the rotor electrode 2 will be less than the capacitance between the stator electrode R and the rotor electrode 2 when the respective stator electrode is located directly above the rotor electrode 2. In the same way, the capacitance in an equivalent position between the stator electrode T and the rotor electrode 2 will be less than the capacitance between the stator electrode S and the rotor electrode 2, while the capacitance for U will be less than the capacitance for T. When the motion of the rotor disk has passed through all four phases R-S-T-U, the stator electrode R will again be located in a position directly above one of the rotor electrodes 2. The increasing error, which has accumulated during the sequence R-S-T-U, will then return to "zero error". A periodic and systematic error is obtained as shown in the diagram in FIG. 7a, in which the ordinate γ shows the magnitude of the error and the abscissa shows the angular motion. The length λ of the period of the error is equal to the separation between two rotor electrodes 2. By applying a geometrical differential cancellation, FIG. 3, according to the principle of the patent previously described, using an additional set of stator electrodes 3' displaced by 180° relative to the first set, and in which both the first set of electrodes 3 and the second set of electrodes 3' are integrated on one and the same disk, the tilt will be of the same magnitude for the set of electrodes 3' but it will have the opposite sign in the phase direction R-S-T-U and thus will give rise to an error curve according to FIG. 7b, which is the inverse of the error curve in FIG. 7a for the upper set of electrodes 3 in FIG. 4. The result on adding the two error curves in FIG. 7a and FIG. 7b will therefore be a straight line as is shown in FIG. 7c in the error diagram with a constant offset distance o to the abscissa.

In the event of a dynamic parallelism error, FIG. 10, between rotor and stator in the form of axial wobble of the rotating rotor disk 1 relative to its axis 6 of rotation, or in the event that one of the rotor or stator disks is subject to a faulty shape as is shown, heavily exaggerated, in FIG. 12, an additional set of stator disks 4" and 4''', FIG. 8, displaced by 90° relative to the pair of disks 4 and 4', is required for a complete cancellation of the error.

One preferred embodiment, which is shown in FIG. 9, is to allow the stator electrodes 3 to surround 360° of the angle of rotation, whereby the number of phase groups R-S-T-U should be evenly divisible by two in order to obtain complete differential cancellation. FIGS. 11 and 13 show how the distance d between (the stationary) rotor disk 1 and the stator disk 4 then varies around the perimeter of the rotor disk, a maximum distance at 0° to a minimum distance at 180° and then back to the maximum at 360°. Since the stator disk encloses 360°, the mean value of the distance d between the rotor and the stator disk will be constant at all rotational positions of the rotor disk 1, and in this way the signal that is excited in the rotor disk will also have a constant amplitude, and thus the phase position will depend only on the displacement of the rotor electrodes relative to the stator electrodes without being influenced by the axial wobble or the faulty shape of the rotor disk 1.

General

In the general form of an axial wobble, the angles of both the rotor 1 and the stator 4 relative to the axis of rotation are not equal to 90°. This is shown in exaggerated form in FIGS. 18 and 19. The rotor disk in FIG. 18 has an angular error a and the stator disk 4 has an angular error β relative to the common axis of rotation 6 of the system. The system then adopts the position shown in FIG. 18 at one angular position of the rotor disk relative to the stator disk. After the rotor disk has rotated by 180°, the system adopts the position shown in FIG. 19.

FIGS. 20 and 21 show more schematically the system at the two extreme positions. The distance between the centre of rotation of the rotor disk and the equivalent point of the stator disk is denoted by "d". The mean radius of the electrode systems of the rotor and of the stator is denoted by "r". The angular error of the rotor relative to the centre of the axis of rotation is α and that of the stator is β.

The minimum distance between the rotor disk and the stator disk in FIG. 20 will then be a=d−r(sinα+sinβ) and the maximum distance b=d+r(sinα+sinβ). The mean value over 360° will be (a+b)/2, which is equal to "d", by replacing the values derived from the figure for "a" and "b".

The distance a between the rotor disk and the stator disk in FIG. 21 will be a=d+r(sin α−sin β) and the distance b=d −r(−sin α+sin β). The mean value over 360° will be (a+b)/2, which is equal to "d", by replacing the values derived from the figure for "a" and "b".

The description above shows that the mean distance between the electrode disks will be constant in the embodiment according to the invention, in the general case with angular errors in both the rotor and the stator disks.

Error Type 6

Built-in separation errors can occur in the electrode geometries of the rotor and stator. These can arise, for example, from the optical masters that are used for manufacture of the rotor and stator disks. In the event of a systematic error in the separation between the rotor electrodes or the stator electrodes, the error position of the electrodes electrode$_1$ - - - electrode$_n$ increases as a monotone function. At the end of one complete revolution, an equally large error arises in the final separation between electrode$_n$ and electrode$_1$ as the error that has accumulated during the previous n-1 separations, although the sign is opposite, since the sum of all errors during one revolution must be equal to zero! Since the electrodes of both the rotor and the stator according to the preferred embodiment enclose the complete revolution of 360°, it will be realised that the geometrical error compensation also works in this case, with the result that the error sum in the signal that is excited in the rotor disk will be zero.

Other Errors Arising from Scaling Geometry

The scaling geometry described in the Swedish patent 7714010-1 is based on the condition for the preferred embodiment, in which four supply phases are used, that the width of the stator electrodes is at most ¼ of the separation between the rotor electrodes. In general, if the number of supply phases used is Φ, the width of the stator electrodes will be a maximum of 1/Φ of the separation of the rotor electrodes. In order to obtain a transmission characteristic between the stator and the rotor electrodes in the form of a sine wave, as is theoretically correct, however, not only should the stator electrode be sine-shaped, but it should also have a width that is half of the separation between the rotor electrodes in the preferred embodiment with four supply phases.

One way of achieving this is shown in FIG. 14. The arrangement of electrodes is shown for the sake of simplicity in linear form. The transmitter electrodes of the stator are arranged into two planes r1 and r2, vertically displaced in the figure. The rotor electrodes are then designed to be sufficiently long to enclose the stator electrodes in both planes in FIG. 14.

One disadvantage of this arrangement is that the circumference of the electrodes in the radial direction becomes larger. This requires a larger diameter of mounting and is a disadvantage when designing the angle transducer.

However, the greatest disadvantage of the arrangement is that the electrodes that are located at the higher mean radius r2 have an area that is larger than those that are located at the lower mean radius r1. A conversion in which both the transmission characteristic in the form of a sine wave and the correct surface engagement function are fully maintained by choosing different heights of the electrodes is not completely possible. However, if such a conversion is carried out, the disadvantage arises, FIG. 14, that all electrodes with the complementary phases R and T, that is, 0° and 180°, are systematically located at the higher radius, while the two other phases S and U, 90° and 270°, are located at the lower radius r1. It is possible that this would give rise to a systematic periodic error in the transmission function between the stator and the rotor. Such an error can be eliminated by calibration in which the deviation is registered at regular intervals over one period of the rotor electrode by comparison with a more accurate system. This is stored in a suitable manner in a memory unit that is questioned during recording of the angular position from the transducer for the corrective term required at the current position.

The method described above, however, is both complicated and impractical. However, the invention comprises another method of arranging the electrodes in order to avoid such systematic errors as those described above.

FIGS. 15, 16 and 17 demonstrate in stages how a complete cancellation pattern can be extracted from the system according to FIG. 14, without influencing the original surface engagement characteristic that is obtained according to the desired electrode pattern in FIG. 14.

FIG. 15 shows how five electrodes R-T-R-T-R (non-coloured) following the four first stator electrodes R-T-R-T (shown in grey) in the upper row are removed, after which four electrodes are again kept. Since five electrodes have been removed, the sequence of this group is different T-R-T-R. The five electrodes T-R-T-R-T following this group are removed. The third group with phase supply R and T starts again with the same sequence as the first group R-T-R-T. Electrodes are removed in the same way from the lower row with phase supply S and U. The electrodes that are coloured grey in FIG. 15 remain.

FIG. 16 shows how the R-T and S-U groups are displaced such that they are located at the same radius r.

The same pattern is repeated after 18 primary electrode separations each of ½ of the rotor electrode separation. The secondary separation λ2 in the set of stator electrodes will in this way equal 18× the primary stator separation, i.e. 9 rotor electrode separations. The number of secondary stator periods λ2 should be an integer in order to achieve complete geometrical symmetry in the location of the electrodes. Since λ2=9 rotor electrode separations, the number of rotor electrodes should thus be n×9, where n is a positive integer greater than 1, in order to obtain a complete number of periods λ2 per revolution.

The stator electrodes cannot be located as shown in FIGS. 14–16 for practical reasons. For the best linearity of the signal that is excited in the electrodes of the rotor disk, each electrode should cover exactly ½ of a rotor electrode separation. The separate transmitter electrodes in the phase groups R-T and S-U would be mutually short-circuited if the location shown in the figures were used, since no gap is allowed between the electrodes.

An acceptable insulation gap is formed around each electrode, while the ideal electrode width and separation are maintained, by "turning" each other electrode through 180° in the way shown in FIG. 17. It will be realised without further explanation that the surface engagement function between the wedge-shaped radial segments that constitute the rotor electrodes 2 and the stator electrodes R-S-T-U will be different, since the electrodes are turned to have their broad side outwards and inwards, respectively. Furthermore, the centre of gravity of the electrodes that have their thinnest part pointing inwards towards the centre will lie at a higher radius than those for which the thinnest part is pointing outwards.

One advantage then is that the direction of the electrodes obtained by the method illustrated in FIG. 17 is permuted in such a manner that the electrodes in the first group that are oriented with their point facing inwards in the direction of the radius, the electrodes R, for example, in the electrode group a at the far left of FIG. 17, are directed in the opposite direction towards the centre of the radius in the next electrode group c that contains the same supply phases. The same effect occurs for the other phase electrodes S-T-U in the electrode groups b, c and d, in order thereafter to be repeated in the same pattern. In this way, complete differential cancellation is obtained of the individual errors to which the scaling geometry is subject.

The geometrical phase permutation described above is, naturally, not limited to the preferred embodiment with four supply phases, but can be adapted in an equivalent manner to other numbers of supply phases.

Absolute Transducer

In order to determine the absolute angular position, a separate set of electrodes, directed in the radial direction and having the form of a sine wave, is used, located at a different radius than that of the "fine electrodes". One preferred embodiment is shown in FIG. 22 and includes four supply electrodes 3, supplied with electrical signals of the phases R-S-T-U, and located on the stator disk of the system. The four transmitter electrodes are, according to the intentions of the invention, distributed over 360° in order to achieve differential geometrical cancellation. FIG. 23 shows the single receiver electrode 2 that collects the signal from the stator electrodes and is located on the rotor disk.

The determination of the absolute value of the angle of rotation proceeds according to the following method, which is given in the form of an example:

The position can be determined using a certain evaluation technology in a measurement unit with a resolution of 1/2048th part of the separation between two rotor electrodes. With a rotor disk that comprises 126 rotor electrodes in one revolution, an angular resolution of 2048×126=258,048 separations per revolution is achieved, that is, approximately 12 seconds of arc. With a scale of the absolute transducer of one electrode per revolution, a resolution of 1/2048th part of a revolution is obtained. The absolute transducer is used to determine which of the 126 positions in the "fine" transducer is valid. Overlap thus exists between the "coarse" and the "fine" transducer when determining the "fine" position, which provides a redundancy of 1/126th part of a revolution, which is approximately 16 units in the coarse counter.

The calculation by which the absolute value of the angle is calculated is, in principle, as follows:
Divide the value of the coarse counter by 16 in order to calculate within which of the 126 positions of the "fine" scale the value is to lie. Rounding to an integer, which must occur in accordance with certain principles, gives an integer, "p". Assume, furthermore, that the counter on the "fine" scale contains the number 1432, for example. An algorithm that, in principle, is as follows is used in order to obtain the absolute value of the total angle:

Total absolute angle=(p−1)*2048+the contents of the fine counter.

Assume that P=27, in the example above:
Total absolute angle=(27−1)*2048+1432=54,680 units of the fine counter.

Since one revolution 360°=258,048 units of the fine counter, the current absolute angle is obtained from: 360/258,048*54,680=76.28348°.

For transducers with higher resolutions, for example, transducers in which the number of rotor electrodes=1008, two or more absolute transducer fields with different resolutions can, where necessary, be placed onto the rotor and the stator disks.

For example, in the example above, one rotor electrode per revolution can be chosen for the "fine" transducer "1", and 24 rotor electrodes per revolution can be chosen for the "coarse" transducer "2". The "coarse" transducer "2" gives a resolution of 24*2048=49,512 steps/revolution. The redundancy will then be 49,512/1008=approximately 49 steps of the coarse counter for each "fine" separation of the rotor.

Electrical Differential Measurement

The system description in all of the above cases has been directed towards demonstrating the function of the differential geometry that is characteristic of the invention. The system with transmitter electrodes 3 on the stator disk 4 and receiver electrodes 2 on the rotor disk 1 has, for the sake of simplicity, been described in accordance with known technology according to Swedish patent 7714010-1 with variations of the embodiment according to the principles of the invention. This means that the supply electrodes 3 on the disk 4, is FIG. 1, interact with one single system of receiver electrodes 2 on the slider (the rotor electrode) 1. In one preferred embodiment of the invention, FIG. 24, two scales are used that are geometrically displaced relative to each other by one half of an electrode separation, while having the same mean radius. As has been previously described, the supply phases R-S-T-U are phase-displaced relative to each other by 90°. One consequence of this is that the phase T is phase-displaced by 180° relative to R and U is in the same way displaced by 180° relative to S. When the two systems of rotor electrodes are excited by the transmitter electrodes on the stator disk, which are common for the two electrode systems, this means that the signal in the electrodes 2' that lie displaced by one half of an electrode separation relative to the electrodes 2 will also lie displaced in phase by 180° with respect to each other. One consequence of this is that the signals from the systems 2 and 2' of electrodes can be applied to the inputs of an electrical differential amplifier 7 of known type. The two signals that are reflected in the electrodes 2 and 2' are then summed to give twice the amplitude when compared with the single scale in FIG. 1.

The great advantage, however, lies on another plane: when disturbing electrical pulses and fields are applied from outside these produce identically shaped disturbance pulses in both electrode systems and are eliminated through the CMR of the differential amplifier. Furthermore, the arrangement of electrodes contributes to further geometrical equalisation of any errors that arise in that the mean value is formed over two separate electrode systems that are physically connected.

According to Swedish patent 7714010-1 and FIG. 1, the signals that are received in the electrodes, etc., of the disk 1 are returned through a capacitive pathway to the supplying disk 4 via separate transmission electrodes. Furthermore, all receiver electrodes 2, 3, etc., are electrically insulated from each other. One or both of these embodiments can, according to the invention, be applied on the device according to the invention. For example, it may be an advantage when measuring the angular position of a continuously rotating shaft to use capacitive feedback to the stator disk.

One major area of application for an angle transducer according to the invention is considered to be systems with angles of motion that are naturally limited, such as link arms in measuring or positioning systems, industrial robots, etc. In these cases, the subsequent differential amplifier and the accompanying evaluation electronic circuits are connected directly to the electrode systems on the rotor disk. The complete electronic system can either be applied in the form of an integrated circuit to the rotor disk or the signal can be taken via cable or optical fibre to integrated or discrete electronic circuits located elsewhere. A signal that is more free from noise and from distortions is obtained in that the signal is read directly from the rotor disk without going through a capacitive transmission.

Other Practical Sources of Error

When using measurement or positioning systems containing one or more connected jointed arms, heavy demands are placed when using traditional types of angle transducer on the bearings of the arms if the precision of the system at its working point is to be maintained. Poor precision in the bearings can lead to stochastic tilts of the type shown in FIG. 25, or to radial displacements as shown in FIG. 26. This leads to the working point of the jointed arm system 11 being subject to a cosine error depending on the tilt illustrated in FIG. 25 and/or the radial and axial displacement illustrated in FIG. 26.

When using the invention described here, however, the effects of tilts of the rotor 1 relative to the stator 4, FIG. 25, or of purely radial displacements of the rotor relative to the stator, FIG. 26, are compensated and eliminated, with respect to the angle of rotation that is read off directly through the special design of the pattern of electrodes 2 and 3 in FIG. 9. It is also a characteristic of the first part of the invention that cosine errors or radial displacements of the electrode systems can be neglected. However, when applied in a real system, the influence on the working point of the system must also be considered. For complete control of the motion of the system at its working point, the system must also collect information concerning stochastic angular errors of the type shown in FIG. 25 and stochastic radial displacements as shown in FIG. 26, together with stochastic axial displacements as shown in FIGS. 25 and 26. These phenomena are usually denoted by one common term: "play".

According to the invention, one further system, FIGS. 27 and 27a, is associated with the electrode systems. A circular transmitter electrode 13 is located on the stator disk 4. Receiver electrodes 14 and 15 are located on the rotor disk 1, and collect a signal from the transmitter electrode 13 by capacitive transmission. The amplitude of the signal received at 14 and 15 depends on the relative positions between 14/15 and the supply electrode 13. The amplitudes in the electrodes 14 and 15 will be equally large in the symmetrical case. In the event of displacement from the symmetrical position, the amplitude will increase in one of the electrodes 14, 15 and decrease in the other.

By placing at least three pairs of electrodes 14,15 distributed equally around the perimeter of the angle transducer, the radial displacement of the jointed arm 11 can be calculated with the aid of suitable mathematical processing of the amplitude values from the electrodes 14 and 15.

In order to determine an erroneous angle setting according to FIG. 25, a further system, FIG. 28, is associated with the electrode systems. A circular transmitter electrode 16 is located on the stator disk 4. At least three receiver electrodes 17 are located on the rotor disk 1, evenly distributed around the perimeter of the angle transducer. The radial extent of the electrodes 17 is less than the radial extent of the electrodes 16 with the intention that the capacitive coupling of the electrode 17 with the electrode 16 is to remain uninfluenced at all possible radial displacements.

The receiver electrodes 17 each collect a signal from the transmitter electrode 16 by capacitive transmission. The amplitude of the signal received at the electrodes 17 depends on the distance between 17 and the transmitter electrode 16. The amplitudes in all electrodes 17 will be equally large in the symmetrical case. In the event of tilt of the jointed arm 11 as shown in FIG. 25, the signal amplitude at each electrode 17 will depend on the magnitude and direction of the error. The angular error and the axial displacement of the jointed arm 11 can be calculated with the aid of appropriate mathematical processing of the amplitude values from the electrodes 17.

FIG. 29 shows one preferred embodiment. The transmitter electrodes 13 and 16 are located at the same radius in the preferred embodiment, and are constituted by one and the same electrode 18. The receiver electrodes 14, 15 and 17, are preferably located such that every second position around the perimeter of the angle transducer is occupied by an electrode group 14, 15 and every second position by an electrode 17. This arrangement minimises the use of space in the radial direction.

In the case in which the radial space is of minor significance, it is an alternative to make the transmitter electrode 18 sufficiently broad that the electrodes 14, 15 and 17 can be distributed independently of each other around the perimeter of the angle transducer.

Rotor Electrodes

A complete rotor disk for use in an angle transducer according to the invention is shown in FIG. 30.

One of the properties of capacitive measurement systems according to the Swedish patent 7714010-1 is that of directly and with high precision being able to determine the magnitude of a relative angular rotation that is less than the separation of the receiver electrodes, which in the example below is ⅟₈₁ parts of a revolution. On the other hand, no information is obtained about which of the receiver electrode separations (in the example this is which of the 81 possible separations) is the current one. The transducer is, therefore, equipped with a second angular measurement system with a receiver electrode separation of 360°, i.e. one complete revolution. This second system, known as the "coarse measurement system" only serves to determine which of the 81 receiver electrode separations in the example is the current one.

FIG. 30 shows the rotor disk 1, the receiver electrodes 2 and 2' and the inner receiver electrodes 2c and 2c' intended to receive signals from the coarse measurement system (FIGS. 34 and 35).

The outer receiver electrodes 2 and 2' thus form, together with the corresponding electrodes 3 on the stator disk 4, the high resolution angular measurement system, while the inner receiver electrodes 2c and 2c' form, together with the corresponding electrodes 3' on the stator disk 4, the coarse measurement system, which determines the angular position within the revolution of 360°. FIG. 31 shows a section of the rotor disk at a higher scale.

The disk is coated with a conducting coating that is preferably constituted by a thin rolled copper foil. The black lines show insulating lines that can be achieved by means of, for example, photolithographic etching.

The lines 19, 20 in FIG. 31, which form the polar lines of limitation for the receiver electrodes, are directed towards a centre that is common for all circular and polar elements that are present on the disk. The width of the electrodes is, therefore, preferably chosen such that the width of the electrodes is equal in size to the spacing between the electrodes. As FIG. 30 makes clear, and as can be seen in more detail in FIG. 31, a preferably thin strip 21 of conducting material is left behind above the upper limit of the electrodes 2. In this way, all electrodes 2 on the rotor disk will be in electrical contact in the form of parallel connection, which means that the very weak signal strength that is received in an individual rotor electrode is multiplied by a factor that principally depends on the number of rotor electrodes 2 on the disk.

In one possible embodiment, the angular separation between the rotor electrodes can be chosen such that 81 electrodes are present around one complete revolution, 360°.

In order to increase further the strength of the signal received, and, in particular, with the aim of reducing the sensitivity of the transducer for external sources of disturbance that produce alternating electrical fields that can be collected by the electrodes 2 of the rotor disk, the rotor disk is equipped with a second system of rotor electrodes 2', FIGS. 30 and 31. The second set of electrodes 2' is created by the same line of electrical insulation as forms the first set of electrodes 2, and since the width of the electrodes has been preferably chosen such that the width of the electrodes is equal to the size of the spacing between electrodes, the shape, area and width of the second set of electrodes 2' will be identical to those of the first set of electrodes 2.

This second set of electrodes 2' is also in electrical connection in the same way as the first set of electrodes 2 through a thin strip of conducting material 22 being left behind below the electrodes.

In one preferred embodiment, the signals produced in the electrode fields 2 and 2' are transferred via through-plated holes 23 and 24, FIG. 31, to arrangements present on the reverse side of the disk in order to be connected to electronic circuits for signal processing, such as the differential amplifier 7 in FIG. 24.

FIG. 32 is intended to explain the formation of differential signals in the sets of electrodes 2 and 2' on the rotor disk.

Both the rotor disk and the stator disk are shown as "X-ray" images in FIG. 32, in the position in which they are located in an assembled angle transducer. The rotor disk 1 with the arrays 2 and 2' of receiving rotor electrodes is thus shown with thin lines, while the stator disk 4, which is equipped with the "transmitting" heart-shaped stator electrodes R,S,T,U, is shown with thicker lines. The differential signal geometry can be most simply seen from the electrodes in FIG. 32 that are supplied with alternating voltage with the phases S and U.

Four supply signals R,S,T,U are used in the preferred system that is described here. These are displaced in phase relative to each other according to the Swedish patent 7714010-1 as shown in the following pattern:

| Supply Signal | R | S | T | U |
| --- | --- | --- | --- | --- |
| phase position, degrees | 0° | 90° | 180° | 270° |

The table shows that the relative phase displacement between supply signals R and T is 180°. In the same way, the relative phase displacement between supply signals S and U is 180°.

FIG. 32 shows that at a certain position, all stator (transmitter) electrodes with phase S are located directly above the rotor electrodes 2 that are directed inwards towards the centre. At the same time, all stator electrodes with phase U are located directly above the rotor electrodes 2' that are directed outwards.

As has been described above, the two sets of rotor electrodes are displaced geometrically by ½ of a rotor electrode separation relative to each other. Since the transmitter electrodes S and U are supplied with voltages that are equal in magnitude and displaced in phase by 180° relative to each other, the signals received in the rotor electrodes 2 and 2' will be equal in magnitude but of opposite sign. This is illustrated in principle in FIG. 33. The two diagrams show how the amplitude U of the signal received by the receiver electrodes 2 and 2' of the rotor varies with a relative change of angle α between the rotor and the stator.

The upper diagram shows in principle the amplitude of the signal that is produced in the rotor electrodes 2, while the lower diagram shows the equivalent for the signal that is produced in the rotor electrodes 2'. As the diagram makes clear, the signals that are received from the set 2' of electrodes constitute a mirror image of the signal in the set 2 of electrodes. This means that it is highly appropriate to apply the two signals each to one input of a differential amplifier 7 as is shown in FIG. 24. In this way, the effect is achieved that the two signals are added, and the resulting output signal from the amplifier has an amplitude that is twice as large. Furthermore, the influence of disturbing signals produced in the receiver electrodes 2 and 2' due to external electrical alternating fields is in this way reduced using the property of the differential amplifier that depresses signals on its inputs that have the same phase (Common Mode Rejection).

Stator Electrodes

The stator disk that interacts with the rotor disk and that contains the stator (transmitter) electrodes is shown in FIG. 34. The electrodes are circularly arranged on this disk according to the principle shown in FIG. 17 and the description that is associated with it. FIG. 34 shows the stator disk 4 on whose surface the transmitter electrodes 3 and the transmitter electrodes 3' of the coarse measuring system are located. The stator disk is manufactured in a similar manner as that described for the rotor disk. FIG. 35 shows a section of the stator disk at a higher scale. FIG. 35 also shows that the permuted geometrical positions of the transmitter electrodes follow the principles described in the above-mentioned patent and it shows the phase positions of the supply signals for a complete electrode group. One revolution of the angle transducer must constitute an integer number of such groups.

Explanation of the Permutation

The transmitter electrodes for a capacitive system of the principle described here, 4-phase, must satisfy the condition that the separation between these electrodes must be equal to (the separation of the rotor (receiver) electrodes)/Φ, i.e. in this case it must be equal to (the separation of the rotor (receiver) electrodes)/4. This means in the example that the separation of the transmitter electrodes must be $1/81 * 1/4$, i.e. $1/324$ parts of a revolution.

This gives the electrode configuration shown in FIG. 14. However, this configuration is not suitable for application in an angle transducer, for several reasons. The most important of these is that the configuration shown in FIG. 14 has a considerable extent in the vertical direction, that is, for application onto the stator disk in the radial direction. This means that the area of those electrodes whose centre of gravity is located at the lower radius r1 is less than the area of those electrodes that are located at the higher radius r2, since, even though the electrodes at the lower radius do have the same angular distribution as the electrodes at the higher radius, they include a smaller length of arc than these. It is possible in theory to compensate for this by compensating the geometry for the electrodes at the lower radius such that the area and the area engagement function become the same as they are for the electrodes at the higher radius. The disadvantage of such a method is the palpable risk of introducing in this way a systematic symmetry error since, as FIG. 14 makes clear, all electrodes at the lower radius r1 are supplied with alternating voltage of phase S or U while all electrodes at the higher radius r2 are supplied with alternating voltage of phase R or T.

It would also conflict with the basic philosophy of this patent, which states that all signal transmission from the transmitting stator disk to the receiving rotor disk is to be arranged in such a manner that differential error correction is achieved. In order to achieve this, complete symmetry in the location of the electrodes is required, in such a manner that any errors that arise, such as deviations in the radius, deviations in the area, deviations in the engagement geometry, or crosstalk between parasitic capacitances, etc., are represented to equal degrees on each one of the sets of phase electrodes R,S,T,U. One example of this symmetry is shown in FIGS. 34 and 35, and in FIG. 17. As is shown in the figures, the electrodes are arranged such that the narrowest part is directed not only inwards towards the centre of rotation, but also outwards away from the centre of rotation. Although all electrodes have the same area and lie at the same radius, the high sensitivity of the system means that somewhat different signals may still be transmitted to the receiver electrodes of the rotor disk, depending on the direction in which the stator electrode faces. Such errors may arise due to, for example, small errors in the geometry of the stator electrodes or due to phase crosstalk. The fundamental rule of the patent concerning differential symmetry thus means that the transmitter electrodes of the stator are arranged such that equal numbers of inward-facing and outward-facing electrodes are present within each phase supply group R,S,T,U. Furthermore, the groups R,S,T,U also contain equal numbers of inward-facing and outward-facing electrodes relative to each other.

In order to change the configuration of the electrodes, it is possible, without influencing the signal transmission function in any other way than a reduction in the total signal amplitude, to remove a freely chosen number of transmitter electrodes R,S,T,U in order to achieve a thinning out of the electrode field.

FIGS. 38 and 39 explain in more detail how the permutation shown in FIGS. 14 to 17 is possible, and how the separation of the transmitter electrodes can be modified, despite the condition laid down in the Swedish patent 7714010-1 that the separation of transmitters must be "(the separation of the receiver electrodes)/Φ, where Φ=the number of supply phases", while still maintaining the condition laid down in the said patent. As has been mentioned at the beginning of this section, the transmitter electrodes are to be geometrically situated such that the first phase electrode R, at a certain possible start position, is located directly above a receiver electrode 2 on the rotor disk, FIG. 38. In this condition, the next phase electrode S is to be displaced by ¼ of the separation of the receiver electrodes, and is thus only halfway located above the same receiver electrode 2. The phase electrode T that follows is to be displaced by 2*¼, i.e. ½ of the separation of the receiver electrodes and is located directly above the space between the receiver electrodes 2, that is, directly above the receiver electrode 2'. In the same way, U is displaced by ¾ of the separation of the receiver electrodes.

The transmitter electrodes in the group R,S,T,U have in FIGS. 14 and 38 been displaced by 0, ¼, ½ and ¾ of the separation of the receiver electrodes relative to one and the same receiver electrode. However, it is not necessary for the signal transmission function that the displacement is made relative to one and the same receiver electrode.

When all receiver electrodes 2 are electrically connected, the same function is obtained if, FIG. 39, R is assumed to lie, as previously, directly above receiver electrode number 1, while the transmitter electrode with phase S is located 1+¼ separations of a receiver electrode away from it. In this case the transmitter electrode is located halfway above the next receiver electrode 2. But the electrode T is located with a displacement of 2+²⁄₄, and U with a displacement of 3+¾ separations of a receiver electrode. In this case, the actual separation of transmitter electrodes thus obtained will be 1¼ times the separation of the receiver electrodes, while the functional separation of transmitter electrodes, that is, their displacement relative to the receiver electrode, will remain at ¼, ²⁄₄ and ¾ times the separation of the receiver electrodes, respectively.

The procedure above gives a transmitter electrode field that is correct with respect to signal production, but is heavily "thinned out", and in which the number of transmitter electrodes is fewer than the number of receiver electrodes of the rotor (by a factor of 1.25). It will be realised through the example above that the transmitter electrodes R,S,T,U can be grouped and moved in a manner that is essentially arbitrary, as long as the following basic rules are followed:

1. The transmitter electrode must maintain its defined geometrical displacement of 0, ¼, ²⁄₄ or ¾ separations of a receiver electrode relative to an arbitrarily selected receiver electrode position.
2. The stator must contain equal numbers of transmitter electrodes of each phase.
3. The geometrical symmetry must be maintained, or it must be created by permutation, for example, by arranging equal numbers of outward-facing electrodes and inward-facing electrodes.

A thinning out of the electrode field as has been described above can be carried out in a large number of ways. FIGS. 14–17 show one method of thinning out that is preferred in this description.

Thus, by permutation of the phase supply electrodes of the stator as is shown in FIG. 17, the primary functional separation of ¼ of a rotor electrode separation between subsequent phase supply electrodes R,S,T,U is maintained.

This is illustrated in FIG. 32 in which, in the position shown, transmitter electrode R is located halfway over a receiver electrode 2' and halfway over a receiver electrode 2. Transmitter electrode S is located directly over a receiver electrode 2 and is in this way displaced in function by ¼ of the separation of the receiver electrodes relative to electrode R. The next electrode, T, is located halfway over a receiver electrode 2 and halfway over a receiver electrode 2', and is thus displaced by ½ of the separation of the receiver electrodes relative to the electrode R and by ¼ of the separation of the receiver electrodes relative to the electrode S. It can be demonstrated in this way that all electrodes are still functionally distributed with a separation that is ¼ of the separation of the receiver electrodes relative to one of the receiver electrodes. However, this distribution is not relative to one and the same electrode, as is the case in FIG. 14. On the other hand, this has no significance since, as has been described above, all receiver electrodes are electrically connected.

Supplementation of the System with Means for Measuring the Magnitude of Radial and Axial Play in the Mechanical System of which the Angle Transducer is Part Although the angle transducer executed according to the invention eliminates errors in specification of angles that arise from shortcomings in the bearings of the machine element onto which the transducer is mounted, positioning accuracy is still influenced mechanically and geometrically in the overall system by play and wobble in its bearings. Even if the angular position has been correctly read by the angular measurement system, errors can still arise through play in the mechanical system of the type shown in FIGS. 25 and 26.

Such errors can be measured and compensated for in real-time by adding a further electrode system. Such an electrode system is described on pages 23–25 and exemplified in FIGS. 27, 28 and 29, where FIGS. 27 and 28 individually demonstrate how radial wobble and axial displacement are measured, respectively. FIG. 29 shows how these two systems can be combined into one common system.

The fact that the output signals from each individual disk 14, 15 in FIGS. 27 and 29 are connected to an electronic unit should be added to the original description of this function. The electronic unit can instantaneously determine the magnitude and direction of any radial wobble present by measuring the amplitudes present at the six plates 14, 15.

Each individual plate 17 in FIGS. 28 and 29 is, in the sane way, connected to an electronic unit that can instantaneously determine the magnitude of the axial displacement and also its angle, if any, according to FIG. 25.

FIG. 36 shows a complete rotor disk equipped with electrodes for measuring play. 14 and 15 are the electrodes for the measurement of radial play that have been previously described, and 17 are the electrodes for measuring axial play.

The line given in dash-dot symbols shows how the signal measurement electrode 16 located on the stator disk interacts with the electrodes 14, 15 and 17.

FIG. 37 shows a complete stator disk equipped with electrodes for measuring play whereby the element added for measuring play is the signal measurement electrode 16.

What is claimed is:

1. An angle transducer comprising a first disk, the rotor (1), with circularly arranged and radially directed receiver electrodes (2) and a second disk, the stator (4), equipped with circularly arranged and radially directed transmitter electrodes (3) arranged at the same radius as the receiver electrodes (2) and with a fixed separation between the receiver electrodes (2) and the transmitter electrodes (3) on the two disks (1,4), whereby the disks (1,4) are arranged coaxially and rotatable relative to each other, and the disks (1, 4) are further separated by a thin air-gap that makes possible a capacitive or an inductive coupling between the electrode systems (2, 3) on the rotor disk (1) and the stator disk (4), whereby the transmitter electrodes (3) are each supplied with an alternating voltage with different phases for neighbouring electrodes, whereby the number of supply phases, $\Phi$, is greater than two, and the separation of transmitter electrodes=the separation of receiver electrodes/$\Phi$, characterised in that the transmitter electrodes (3) of the stator (4) are geometrically arranged such that errors in their geometry relative to the geometry of the receiver electrodes (2) produce equal but opposite error signals in the receiver electrodes (2) of the rotor (1).

2. The angle transducer according to claim 1, characterised in that n receiver electrodes (2) are evenly distributed over the complete perimeter of the rotor (1), whereby n is an integer, and that n*$\Phi$ transmitter electrodes (3) are evenly distributed over the complete perimeter of the stator (4).

3. The angle transducer according to claim 2, characterised in that the transmitter electrodes (3) are divided into groups, where each group comprises at least $\Phi$ electrodes each supplied by its alternating voltage of different phase, whereby the stator (4) comprises at least three such groups of transmitter electrodes.

4. The angle transducer according to claim 2, characterized in that the number of rotor electrodes (2) is chosen such that n=z*(2$\Phi$+1), where z is an integer greater than or equal to one.

5. The angle transducer according to claim 2, characterized in that n is evenly divisible by two.

6. The angle transducer according to claim 2, characterised in that the order of the phases in the electrodes (3) of the stator (4) is subject to a geometrical continuous permutation in order to add a secondary division of the stator period with a magnitude of (2$\Phi$+1)* the separation of the rotor electrodes.

7. The angle transducer according to claim 2, characterised in that the rotor disk (1) and the stator disk (4) comprise a second system of electrodes in order to measure directly the angular position of the rotor disk (1) within one complete revolution of 360°.

8. The angle transducer according claim 2, characterized in that it further comprises a special system of electrodes (13–17) to measure the motions of an included mechanical part that arise from play in the system.

9. The angle transducer according to claim 8, characterised in that the motion is stochastic motion in the radial direction.

10. The angle transducer according to claim 9, characterised in that the special system of electrodes comprises electrodes (17;16) integrated in the rotor and stator disks (1;4) that are excited by a transmitter electrode (16) on the stator disk.

11. The angle transducer according to claim 8, characterized in that the motion is motion in the axial direction.

12. The angle transducer according to claim 11, characterised in that the special system of electrodes comprises electrodes (14,15;13) that are integrated in the rotor and stator disks (1;4) and that are excited by a transmitter electrode (13) on the stator disk.

13. The angle transducer according to claims 10, characterized in that the transmitter electrode is a common transmitter electrode (18).

14. The angle transducer according to claim 8, characterized in that the motion is an angular twist relative to an incorporated stationary part (10).

15. The angle transducer according to claim 3, characterized in that the number of rotor electrode (2) is chosen such that n =z*(2$\Phi$+1), where z is an integer greater than or equal to one.

16. The angle transducer according to claim 3, characterized in that n is evenly divisible by two.

17. The angle transducer according o claim 4, characterized in that n is evenly divisible by two.

18. The angle transducer according to claim 3, characterized in that the order of the phases in the electrodes (3) of the stator (4) is subject to a geometrical continuous permutation in order to add a secondary division of the stator period with a magnitude of (2$\Phi$+1)* the separation of the rotor electrodes.

19. The angle transducer according to claim 4, characterized in that the order of the phases in the electrodes (3l) of the stator (4) is subject to a geometrical continuous permutation in order to add a secondary division of the stator period with a magnitude of (2$\Phi$+1)* the separation of the rotor electrodes.

20. The angle transducer according to claim 5, characterized in that the order of the phases in the electrodes (3) of the stator (4) is subject to a geometrical continuous permutation in order to add a secondary division of the stator period with a magnitude of (2$\Phi$+1)* the separation of the rotor electrodes.

* * * * *